US010912019B2

(12) United States Patent
Brchan et al.

(10) Patent No.: US 10,912,019 B2
(45) Date of Patent: Feb. 2, 2021

(54) DISTRIBUTED WIRELESS INTERCOM AUDIO ROUTING OVER ETHERNET WITH SYNCHRONIZATION AND ROAMING

(71) Applicant: Robert Bosch GmbH, Stuttgart (DE)

(72) Inventors: Jason Brchan, Omaha, NE (US); Jim Andersen, Lincoln, NE (US); Keith Jenkins, Lincoln, NE (US); La Rhue Gene Friesen, Lincoln, NE (US)

(73) Assignee: Robert Bosch GbmH, Stuttgart (DE)

( * ) Notice: Subject to any disclaimer, the term of this patent is extended or adjusted under 35 U.S.C. 154(b) by 49 days.

(21) Appl. No.: 16/328,561

(22) PCT Filed: Mar. 14, 2017

(86) PCT No.: PCT/EP2017/055945
§ 371 (c)(1),
(2) Date: Feb. 26, 2019

(87) PCT Pub. No.: WO2017/157909
PCT Pub. Date: Sep. 21, 2017

(65) Prior Publication Data
US 2020/0187110 A1 Jun. 11, 2020

Related U.S. Application Data

(60) Provisional application No. 62/307,995, filed on Mar. 14, 2016.

(51) Int. Cl.
*H04W 48/20* (2009.01)
*H04W 56/00* (2009.01)
(Continued)

(52) U.S. Cl.
CPC ....... *H04W 48/20* (2013.01); *H04W 56/0015* (2013.01); *H04W 64/00* (2013.01);
(Continued)

(58) Field of Classification Search
CPC . H04W 48/20; H04W 56/0015; H04W 64/00; H04W 84/22; H04W 88/08; H04W 92/20
(Continued)

(56) References Cited

U.S. PATENT DOCUMENTS 6,025,871 A * 2/2000 Kantor ................. G06F 3/1423
348/14.07
6,374,356 B1 * 4/2002 Daigneault .............. G07C 9/27
726/20

(Continued)

FOREIGN PATENT DOCUMENTS

| CN | 105357136 A | 2/2016 |
|----|-------------|--------|
| WO | 2015158266 | 10/2015 |
| WO | 2017157909 A1 | 9/2017 |

OTHER PUBLICATIONS

International Search Report and Written Opinion for Application No. PCT/EP2017/055945 dated May 16, 2017 (15 pages).

(Continued)

*Primary Examiner* — Hai V Nguyen
(74) *Attorney, Agent, or Firm* — Michael Best & Friedrich LLP

(57) ABSTRACT

Methods and systems are presented for providing audio routing and roaming functionality for a wireless intercom system including a plurality of wireless access points. A first wireless access point is configured to receive a communication from a first wireless intercom device and identify a home access point for the first wireless intercom device. The first wireless access point transmits audio data from the first wireless intercom device directly to the intercom system in response to a determination that the first wireless access point is the home access point for the first wireless device. The audio data from the first wireless intercom device is transmitted to the intercom system through a second wireless access point in response to a determination that the (Continued)

second wireless access point is the home access point for the first wireless intercom device.

14 Claims, 4 Drawing Sheets

(51) Int. Cl.
  *H04W 64/00* (2009.01)
  *H04W 84/22* (2009.01)
  *H04W 88/08* (2009.01)
  *H04W 92/20* (2009.01)
(52) U.S. Cl.
  CPC ............ *H04W 84/22* (2013.01); *H04W 88/08* (2013.01); *H04W 92/20* (2013.01)
(58) Field of Classification Search
  USPC .................................. 455/500; 340/1.1–16.1
  See application file for complete search history.

(56) References Cited

U.S. PATENT DOCUMENTS

| | | | | |
|---|---|---|---|---|
| 6,600,734 | B1* | 7/2003 | Gernert | H04M 7/0069 370/352 |
| 6,970,183 | B1* | 11/2005 | Monroe | G08B 7/062 348/143 |
| 7,082,314 | B2 | 7/2006 | Farmer et al. | |
| 7,098,773 | B2* | 8/2006 | Berkman | H04B 3/56 340/12.38 |
| 7,277,018 | B2* | 10/2007 | Reyes | G08B 7/06 340/521 |
| 7,292,853 | B2 | 11/2007 | Nam et al. | |
| 7,460,020 | B2* | 12/2008 | Reyes | G08B 7/06 340/506 |
| 7,492,248 | B1* | 2/2009 | Bjorklund | H04W 16/00 340/7.2 |
| 7,692,555 | B2* | 4/2010 | Stanley | H02J 13/0075 340/12.23 |
| 7,760,721 | B2* | 7/2010 | Stogel | H04L 65/1069 370/389 |
| 7,844,295 | B1 | 11/2010 | Ngan | |
| 8,042,049 | B2* | 10/2011 | Killian | H04L 67/125 715/740 |
| 8,503,396 | B2 | 8/2013 | Blanchette et al. | |
| 8,692,665 | B2* | 4/2014 | Hicks, III | G08B 25/10 340/538 |
| 8,786,189 | B2* | 7/2014 | Mayfield | H05B 47/19 315/76 |
| 8,798,018 | B2 | 8/2014 | Friday et al. | |
| 8,847,749 | B2* | 9/2014 | Hicks, III | H04W 48/18 340/501 |
| 9,060,074 | B2* | 6/2015 | Wagner | H04M 11/025 |
| 9,088,876 | B2* | 7/2015 | Patel | H04W 8/085 |
| 9,191,478 | B2 | 11/2015 | Yu | |
| 9,232,371 | B2* | 1/2016 | Zhang | H04M 1/7255 |
| 9,270,931 | B2* | 2/2016 | Frankel | H04L 29/06 |
| 9,319,189 | B2* | 4/2016 | Seo | H04J 11/005 |
| 9,338,816 | B2* | 5/2016 | Liu | H04W 36/0061 |
| 9,374,682 | B2* | 6/2016 | Weng | H04L 12/1818 |
| 9,584,336 | B2* | 2/2017 | Dunn | H04L 12/283 |
| 9,716,348 | B2* | 7/2017 | Spiel | H01R 24/22 |
| 9,832,621 | B2* | 11/2017 | Wen | H04L 51/046 |
| 9,900,164 | B2* | 2/2018 | Spiel | H04L 12/10 |
| 10,009,914 | B2* | 6/2018 | Velu | H04W 72/1242 |
| 10,050,802 | B2* | 8/2018 | Dunn | H04L 67/125 |
| 10,084,611 | B2* | 9/2018 | Hersche | G09B 29/00 |
| 10,340,057 | B2* | 7/2019 | Spiel | H01B 9/003 |
| 10,499,412 | B2* | 12/2019 | Velu | H04W 72/1242 |
| 10,540,089 | B2* | 1/2020 | Chen | H04M 1/7255 |
| 10,624,000 | B2* | 4/2020 | Jenkins | H04L 67/16 |
| 2003/0193946 | A1* | 10/2003 | Gernert | H04W 92/02 370/389 |
| 2004/0081140 | A1* | 4/2004 | Martin | H04L 47/822 370/352 |
| 2005/0128048 | A1* | 6/2005 | Krzyzanowski | G08C 17/02 340/3.71 |
| 2005/0219360 | A1* | 10/2005 | Cusack | G07C 9/257 348/156 |
| 2006/0017324 | A1* | 1/2006 | Pace | H04B 3/54 307/3 |
| 2006/0056386 | A1* | 3/2006 | Stogel | H04L 65/1069 370/351 |
| 2006/0109113 | A1* | 5/2006 | Reyes | G08B 25/085 340/541 |
| 2007/0052850 | A1* | 3/2007 | Vinson | H04N 7/142 348/552 |
| 2007/0080801 | A1* | 4/2007 | Weismiller | A61B 5/411 340/539.13 |
| 2007/0096872 | A1* | 5/2007 | Nguyen | G07C 9/27 340/5.61 |
| 2007/0206570 | A1* | 9/2007 | Gernert | H04M 7/0069 370/352 |
| 2008/0048851 | A1* | 2/2008 | Reyes | G08B 25/016 340/506 |
| 2008/0122648 | A1* | 5/2008 | Ebrom | H04L 12/282 340/4.37 |
| 2008/0136581 | A1* | 6/2008 | Heilman | H04L 12/2803 340/3.1 |
| 2008/0143550 | A1* | 6/2008 | Ebrom | G06F 9/54 340/12.29 |
| 2008/0169910 | A1* | 7/2008 | Greene | H02J 50/20 340/10.34 |
| 2009/0160673 | A1* | 6/2009 | Cirker | H04W 4/029 340/12.22 |
| 2009/0257416 | A1* | 10/2009 | Walker | H04W 8/20 370/338 |
| 2010/0001838 | A1* | 1/2010 | Miodownik | G16H 40/20 340/10.1 |
| 2010/0158260 | A1* | 6/2010 | Huddart | H04R 5/04 381/56 |
| 2010/0299724 | A1* | 11/2010 | Masiyowski | H04L 63/30 726/4 |
| 2010/0309894 | A1* | 12/2010 | Csaszar | H04L 12/4641 370/338 |
| 2010/0316237 | A1 | 12/2010 | Elberbaum | |
| 2011/0261202 | A1* | 10/2011 | Goldstein | G08B 13/19602 348/149 |
| 2012/0039230 | A1* | 2/2012 | Blanchette | H04L 45/66 370/312 |
| 2012/0126700 | A1* | 5/2012 | Mayfield | H05B 47/19 315/86 |
| 2012/0158937 | A1* | 6/2012 | Lee | H04L 65/4084 709/223 |
| 2012/0289226 | A1* | 11/2012 | Burgess | H04W 4/025 455/434 |
| 2013/0157674 | A1* | 6/2013 | Jylha-Ollila | H04L 65/1069 455/450 |
| 2013/0196706 | A1* | 8/2013 | Patel | H04L 61/1529 455/518 |
| 2013/0214898 | A1* | 8/2013 | Pineau | H04L 63/101 340/5.6 |
| 2013/0214901 | A1* | 8/2013 | Pineau | H04W 4/80 340/5.61 |
| 2013/0214902 | A1* | 8/2013 | Pineau | H04L 63/101 340/5.61 |
| 2013/0260737 | A1* | 10/2013 | Sampat | G06F 9/44526 455/418 |
| 2013/0300536 | A1* | 11/2013 | Bell | G08B 27/001 340/7.45 |
| 2014/0002236 | A1* | 1/2014 | Pineau | G07C 9/00309 340/5.6 |
| 2014/0112216 | A1* | 4/2014 | Seo | H04L 5/14 370/280 |
| 2014/0129853 | A1* | 5/2014 | Diab | H04L 12/413 713/310 |
| 2014/0148209 | A1* | 5/2014 | Weng | H04L 12/1818 455/518 |

(56) References Cited

U.S. PATENT DOCUMENTS

| | | | |
|---|---|---|---|
| 2014/0167928 A1* | 6/2014 | Burd | G06F 16/972 340/12.5 |
| 2014/0171139 A1* | 6/2014 | Liu | H04W 4/10 455/518 |
| 2014/0219431 A1* | 8/2014 | Wagner | H04M 11/025 379/167.02 |
| 2014/0269660 A1* | 9/2014 | Dunn | H04L 67/36 370/338 |
| 2014/0337739 A1* | 11/2014 | Chen | H04M 1/7255 715/727 |
| 2014/0362764 A1* | 12/2014 | Aksu | H04L 65/80 370/328 |
| 2014/0376405 A1* | 12/2014 | Erickson | H04L 9/3263 370/254 |
| 2015/0022316 A1* | 1/2015 | Dixon | G08B 29/02 340/5.51 |
| 2015/0092774 A1* | 4/2015 | Fartmann | H04L 47/15 370/389 |
| 2015/0097689 A1* | 4/2015 | Logue | H04L 65/1036 340/632 |
| 2015/0109104 A1* | 4/2015 | Fadell | H04L 67/12 340/5.65 |
| 2015/0145643 A1* | 5/2015 | Fadell | G08B 27/003 340/5.51 |
| 2015/0213042 A1* | 7/2015 | Cao | G06F 16/90324 707/706 |
| 2015/0245410 A1* | 8/2015 | Liu | H04W 88/08 370/331 |
| 2015/0312394 A1* | 10/2015 | Mirza | H04L 12/282 455/420 |
| 2015/0319407 A1* | 11/2015 | Frankel | H04L 65/608 348/14.02 |
| 2016/0005247 A1* | 1/2016 | Mehl | G07C 9/28 340/5.61 |
| 2016/0242148 A1* | 8/2016 | Reed | H04L 45/66 |
| 2016/0337279 A1* | 11/2016 | Lu | H04L 51/10 |
| 2016/0363980 A1* | 12/2016 | Spiel | H04L 12/10 |
| 2017/0026987 A1* | 1/2017 | Velu | H04W 72/048 |
| 2017/0149406 A1* | 5/2017 | Spiel | H01B 9/003 |
| 2017/0179650 A1* | 6/2017 | Spiel | H01R 13/665 |
| 2017/0237577 A1* | 8/2017 | Dunn | H04L 12/283 370/338 |
| 2018/0131531 A1* | 5/2018 | Spiel | H04L 12/10 |
| 2018/0249485 A1* | 8/2018 | Velu | H04L 47/2475 |
| 2019/0044747 A1* | 2/2019 | Dunn | H04L 12/282 |
| 2019/0230559 A1* | 7/2019 | Jenkins | H04L 67/34 |
| 2019/0304631 A1* | 10/2019 | Spiel | H01B 9/003 |

OTHER PUBLICATIONS

Examination Report No. 1 from the Australian Intellectual Property Office for Application No. 2017234059 dated Feb. 21, 2019 (4 pages).

Examination Report No. 3 from the Australian Intellectual Property Office for Application No. 2017234059 dated Sep. 9, 2019 (4 pages).

National Intellectual Property Administration P.R. China First Office Action and Search Report for Application No. 201780017133.1 dated May 28, 2020 (13 pages).

* cited by examiner

DISTRIBUTED WIRELESS INTERCOM AUDIO ROUTING OVER ETHERNET WITH SYNCHRONIZATION AND ROAMING

RELATED APPLICATIONS

This application claims the benefit of U.S. Provisional Patent Application No. 62/307,995, filed Mar. 14, 2016, entitled "DISTRIBUTED WIRELESS INTERCOM AUDIO ROUTING OVER ETHERNET WITH SYNCHRONIZATION AND ROAMING," the entire contents of which are incorporated herein by reference.

BACKGROUND

The present invention relates to intercom systems that support wireless communication devices.

SUMMARY

In one embodiment, the invention provides an intercom system in which portable wireless beltpack devices are communicatively coupled to one of a plurality of access points. The access points are connected directly to the intercom system via Ethernet connections and can be daisy chained and/or routed through Ethernet switches for a direct connection. The access points are synchronized to permit control and minimization of audio latency on the network. The access points themselves distribute the management of data and audio and no central controller is used. The "cellular-type" roaming of a beltpack device from one access point to another is therefore not limited by a controller on the Ethernet between the intercom and the access points. This results in improvements in system and installation costs, reliability, and system complexity as well as a system that is easily scalable.

In another embodiment, the invention provides a portable wireless beltpack device configured to identify its home "access point" when connecting to any of the plurality of access points. If the access point determines that it is not the "home" access point for a beltpack device that is transmitting audio, the access point forwards the received audio from the beltpack to the beltpack's home access point via the Ethernet connection. The beltpack's home access point then forwards the received audio to the intercom system. As such, beltpacks are able to roam from one access point to another while functionality continues as though it were always connected to its home access point.

In yet another embodiment, the invention provides methods and systems for providing audio routing and roaming functionality for a wireless intercom system including a plurality of wireless access points. A first wireless access point is configured to receive a communication from a first wireless intercom device and identify a home access point for the first wireless intercom device. The first wireless access point transmits audio data from the first wireless intercom device directly to the intercom system in response to a determination that the first wireless access point is the home access point for the first wireless device. The audio data from the first wireless intercom device is transmitted to the intercom system through a second wireless access point in response to a determination that the second wireless access point is the home access point for the first wireless intercom device.

In various embodiments, the intercom system is configured to allow wireless keypanels/beltpacks to roam between RF access points and connect on the Ethernet to an intercom system, operate independently, or operate as a group of access points without an intercom system. If used with an intercom system, the access points are connected directly using standard Ethernet technology. A central server is not required to manage the wireless keypanels/beltpacks or access points. Each keypanel/beltpack is assigned a "home" access point and remembers its "home" access point's electronic address. When connecting to an access point as a "visitor," the keypanel/beltpack sends the access point its "home" access point's electronic address and the access point then routes signals from the "visitor" keypanel/beltpack through the network to the "home" access point of the keypanel/beltpack and then, if used, to the intercom system. Therefore, beltpacks are able to roam between access points without having to reestablish a connection from an access point audio port to an intercom audio port. The beltpacks, access points, and intercom audio are all synchronized to allow uniform, minimized latency of the audio signal routed between the access points and the intercom.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
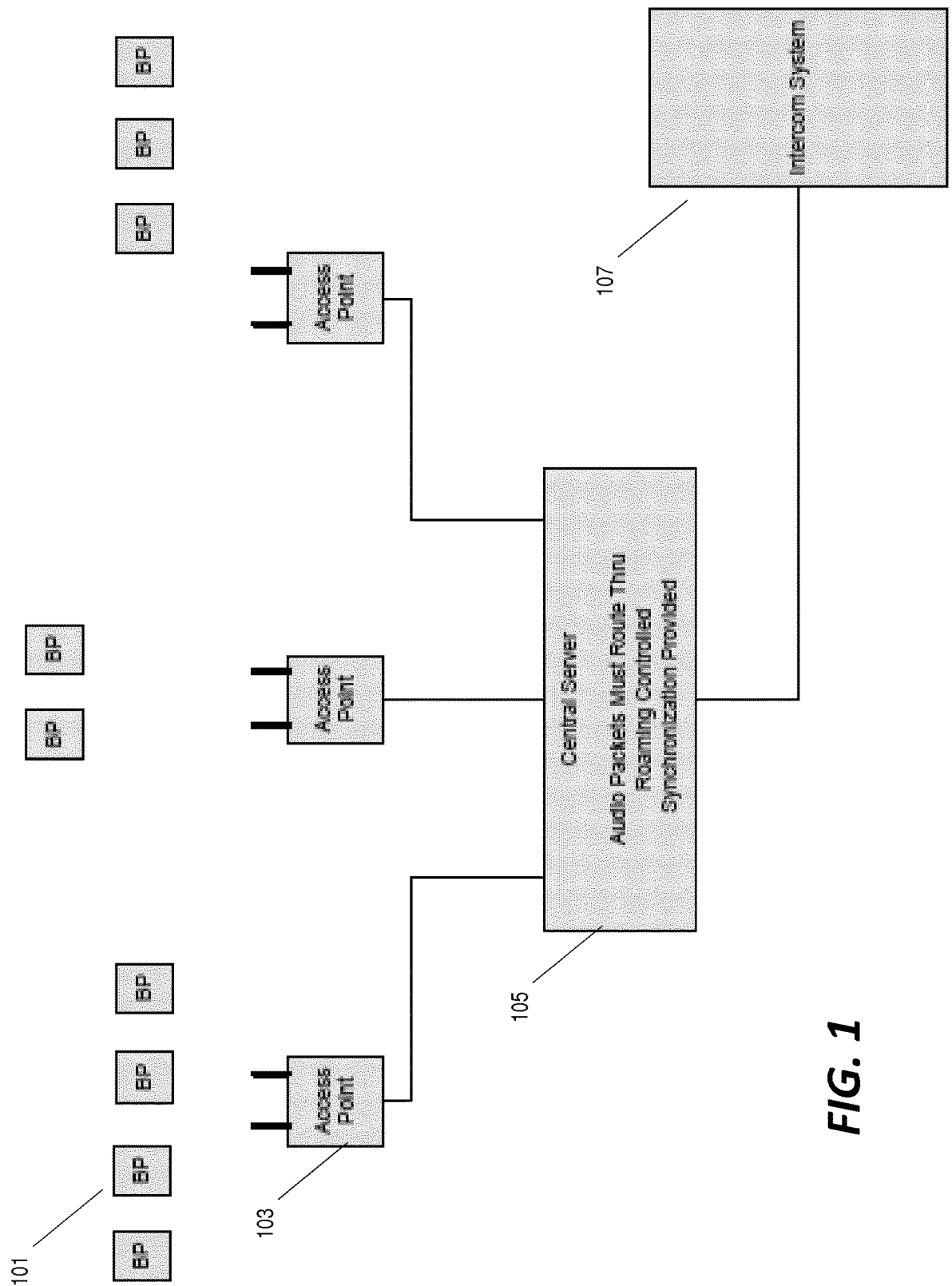
FIG. 1 is a block diagram of an intercom system with a central server for managing and routing audio data.

FIG. 1 illustrates an example of a centralized wireless intercom system. The system includes a plurality of portable wireless beltpack devices 101. Each beltpack device 101 connects to one of a plurality of access points 103. In some implementations, a beltpack device 101 will connect to whichever access point 103 is currently in range or whichever access point 103 provides the strongest connection and has an available RF channel to accommodate a beltpack. When a user operates a beltpack device 101 to transmit audio to the intercom system, the access point 103 receives the audio data from the beltpack and routes the audio data packets through a central server 105. The central server 105 controls roaming and synchronization of the audio data and forwards the received audio data to the intercom system 107.

However, the centralized intercom system of FIG. 1 presents some limitations.

First, the cost of procuring, installing, and maintaining a centralized controller adds to the overall cost of the system. The centralized system is not easily scalable compared to the decentralized system. The centralized controller also presents a single point of failure—if there is a problem with the central server 105, then the entire wireless intercom network becomes unusable.

Figure 2:
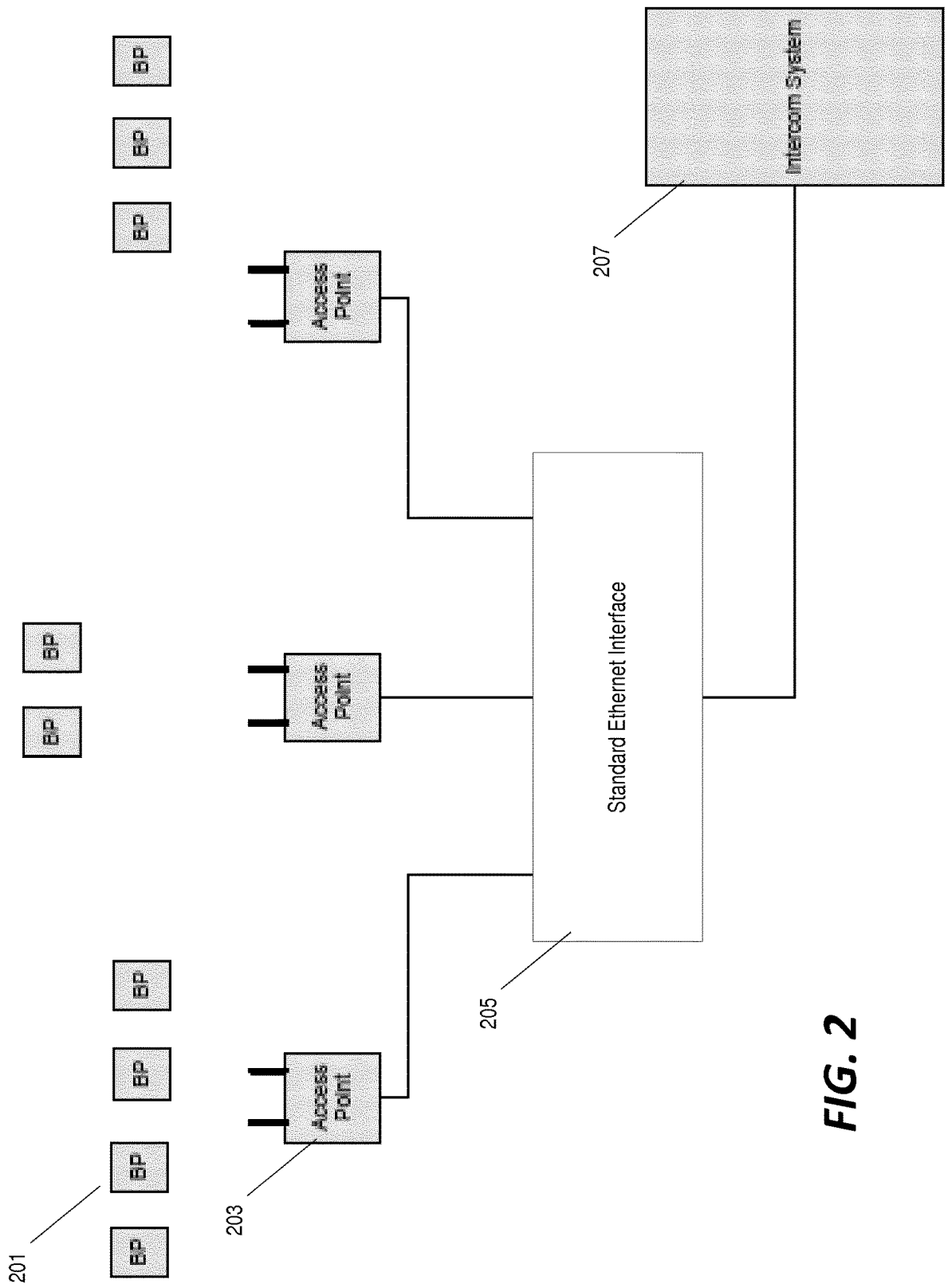
FIG. 2 is a block diagram of an intercom system that does not require a central server for managing and routing audio data.

FIG. 2 illustrates an example of a wireless intercom system that does not include a central controller. Again, the portable wireless beltpack devices 201 each connect to one of a plurality of access points 203. However, the access points 203 communicate with each other and with the intercom system 207 through a standard Ethernet interface 205. The system of FIG. 2 can be connected and installed using standard Ethernet signaling and cable to simply installation, makes it universal, and reduces wiring costs. Furthermore, the access points do not need to be connected to a single central controller and, therefore, the single point of failure is removed. If a single access point fails, the intercom system can continue to operate with the remaining access points.

Figure 3:
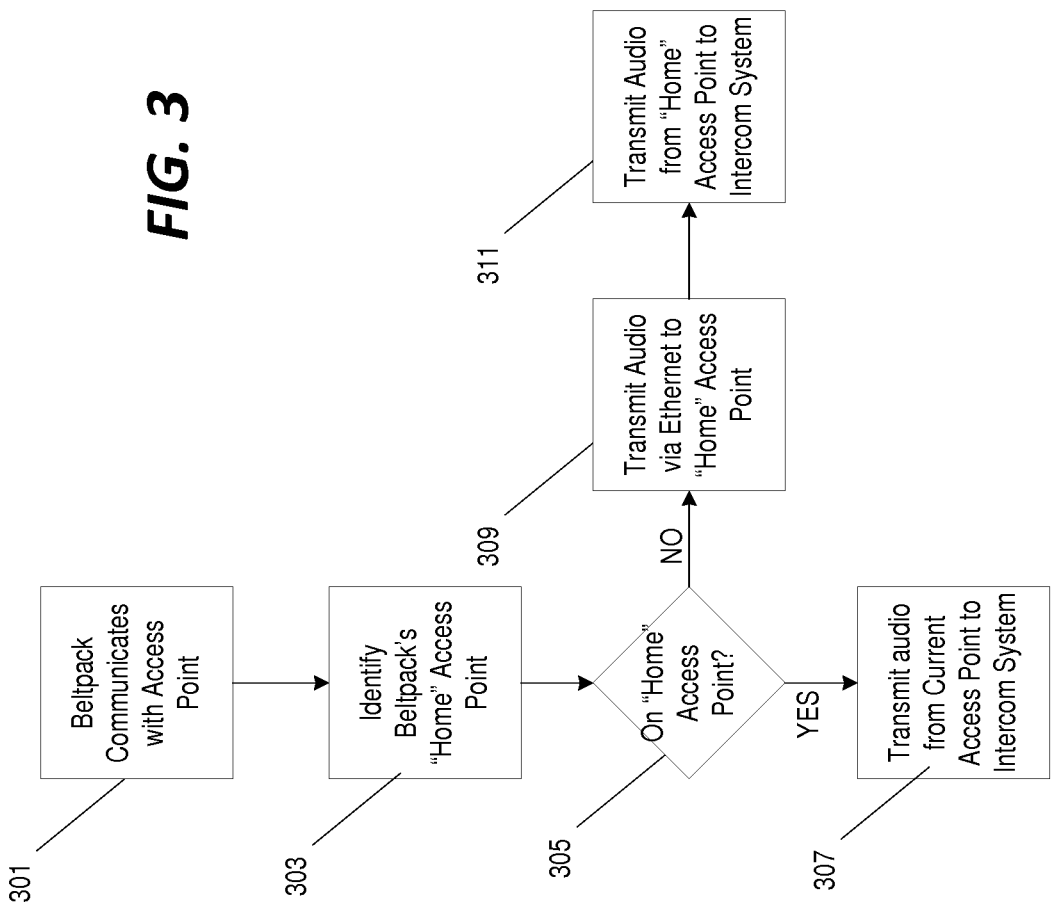
FIG. 3 is a flowchart of a method for routing audio data from a beltpack device through one or more access points to the intercom system using the system of FIG. 2.

FIG. 3 further illustrates how audio data transmitted from each beltpack is processed by the system of FIG. 2 and ultimately transmitted to the intercom system 207. Each beltpack device 201 is assigned a "home" access point by the user when the system is initially set up. Each beltpack device 201 is programmed to identify its "home" access point using an electronic address. When a beltpack device connects with an access point (step 301), it identifies its "home" access point by the electronic address (step 303). If the access point receiving the data from the beltpack determines that it is the "home" access point for the beltpack (step 305), then the access point processes the received data and transmits it directly to the intercom system through the Ethernet connection (step 307). However, if the access point determines that the beltpack is a "visitor" (step 305), then the access point identifies the beltpack's "home" access point by the electronic address provided by the beltpack and transmits the received audio data via the Ethernet connection to the beltpack's "home" access point (step 309). The beltpack's "home" access point then processes the received data and transmits it directly to the intercom system through the Ethernet connection (step 311). As such, the beltpack is able to "roam" physically and can wirelessly transmit audio through any of the access points of the intercom system. However, regardless of the current location of the beltpack or the particular access point that the beltpack is currently connected to, the intercom system receives the audio data generated by the beltpack as though the beltpack had been connected to its "home" access point.

Figure 4:
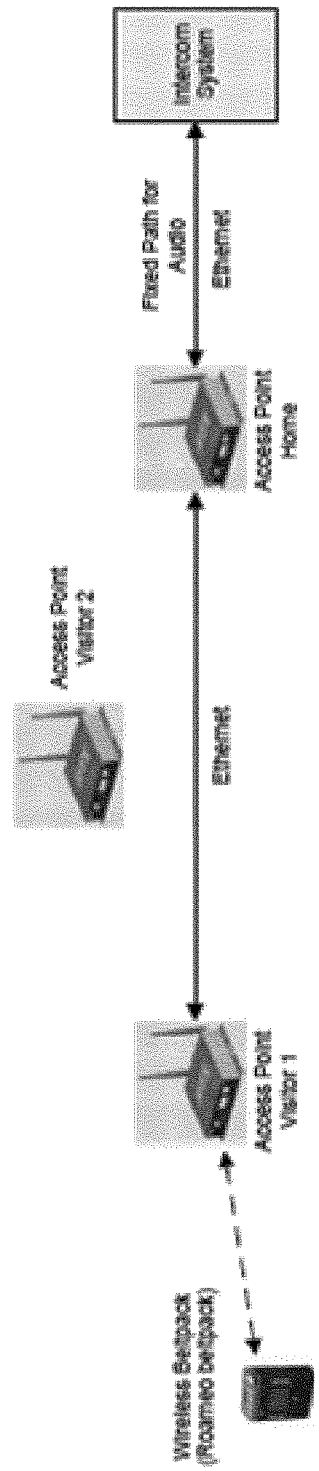
FIG. 4 is a schematic diagram of a beltpack device transmitting audio data while connected as a visitor on a first access point.
Figure 5:
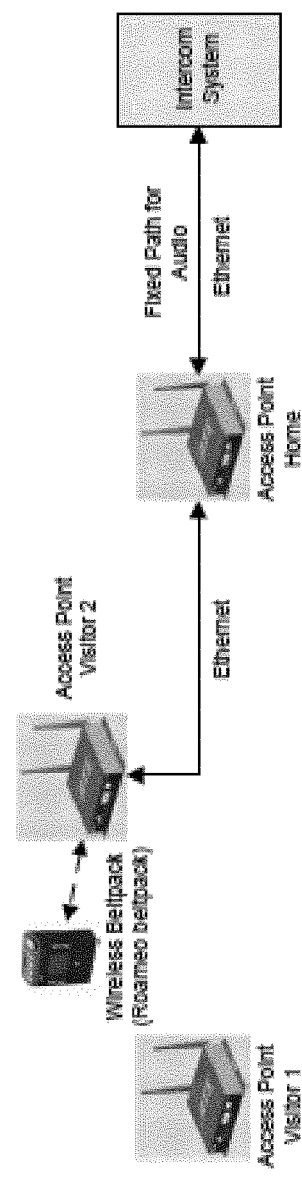
FIG. 5 is a schematic diagram of the beltpack device of FIG. 4 transmitting audio data while connected as a visitor on a second access point.
Figure 6:
FIG. 6 is a schematic diagram of the beltpack device of FIG. 4 transmitting audio data while connected to its home access point.

FIGS. 4-6 illustrate various examples of the method of FIG. 3. In these examples, the system includes three different access points (identified as "Access Point Visitor 1," "Access Point Visitor 2," and "Access Point Home"). In the example of FIG. 4, the wireless beltpack is connected to a first access point as a "visitor" (Access Point Visitor 1) and generates audio data to be sent to the intercom system. The first access point (Access Point Visitor 1) receives the electronic address of the wireless beltpack's "home" access point and transmits the audio data from the beltpack to its "home" access point via the Ethernet connection. The audio data is then routed by the "home" access point to the intercom system via a fixed audio path. The intercom system likewise also transmits audio data to the access points which then wirelessly transmits the data to be received by the appropriate beltpack.

Similarly, in the example of FIG. 5, the wireless beltpack connects to the second access point (Access Point Visitor 2) and generates audio data to be sent to the intercom system. The second access point is also able to identify the beltpack's "home" access point and forwards the audio data over the Ethernet connection to the "home" access point where it is then routed to the intercom system via a fixed audio path.

Finally, in the example of FIG. 6, the beltpack is connected to its "home" access point. The access point determines that it is the "home" access point for the beltpack based on the electronic address received from the beltpack and, therefore, the access point routes the audio data directly to the intercom system via the fixed audio path.

Although the examples illustrated in FIGS. 4-6 describe system where audio data is routed between the access points and an intercom system, in some implementations, the system does not include any separate "intercom system." In such implementations, the access points are configured to interact and manage data such that audio data received from one beltpack is transmitted to another beltpack as appropriate directly through the access points.

Thus, the invention provides, among other things, a distributed wireless intercom system for routing audio data over Ethernet between multiple access point in order to provide audio synchronization and roaming for connected portable wireless beltpack devices. Various features and advantages of the invention are set forth in the following claims.

What is claimed is:

1. A wireless access point for an intercom system, the wireless access point comprising:
   a wireless transceiver; and
   an electronic processor configured to
      receive a communication from a first wireless intercom device,
      identify a home access point for the first wireless intercom device,
      transmit audio data from the first wireless intercom device directly to the intercom system in response to a determination that the wireless access point is the home access point for the first wireless intercom device, and
      transmit audio data from the first wireless intercom device to the intercom system through a second wireless access point in response to a determination that the second wireless access point is the home access point for the first wireless intercom device.

2. The wireless access point of claim 1, wherein the wireless access point is communicatively coupled to the second wireless access point by a wired data connection, and wherein the electronic processor is configured to transmit the audio data from the first wireless intercom device to the intercom system through the second wireless access point by transmitting the audio data from the first wireless intercom device to the second wireless access point through the wired data connection.

3. The wireless access point of claim 2, wherein the wired data connection includes an Ethernet connection.

4. The wireless access point of claim 2, wherein the electronic processor is further configured to
   receive a second audio data stream from the second wireless access point through the wired data connection, wherein the second audio data stream is wirelessly received by the second wireless access point from a second wireless intercom device, and transmit the second audio data stream through the wireless transceiver to one or more additional wireless intercom devices connected to the intercom system through the wireless access point.

5. The wireless access point of claim 4, wherein the electronic processor is further configured to regulate the second audio data stream from the second wireless access point according to synchronization parameters defined for wireless intercom devices that have been assigned the wireless access point as their home wireless access point and to minimize audio latency.

6. The wireless access point of claim 1, wherein the electronic processor is configured to identify the home access point for the first wireless intercom device by receiving a signal from the first wireless intercom device identifying the home access point assigned to the first wireless intercom device.

7. The wireless access point of claim 1, wherein the home access point assigned to the first wireless intercom device is selected based on a location where the first wireless intercom device is most often operated.

8. A method of routing audio stream data in an intercom system, the intercom system including a plurality of wireless access points and a plurality of wireless intercom devices, wherein each wireless intercom device of the plurality of wireless intercom devices is assigned one wireless access point of the plurality of wireless access points as a home access point for the wireless intercom device, the method comprising:

receiving, by a first wireless access point of the plurality of wireless access points, a communication from a first wireless intercom device of the plurality of wireless intercom devices;

identifying, by the first wireless access point, a home access point for the first wireless intercom device;

transmitting, by the first wireless access point, a first audio data stream from the first wireless intercom device directly to the intercom system in response to a determination that the first wireless access point is the home access point for the first wireless intercom device;

receiving, by the first wireless access point, a communication from a second wireless intercom device of the plurality of wireless intercom devices;

identifying, by the first wireless access point, a home access point for the second wireless intercom device;

transmitting, by the first wireless access point, a second audio data stream from the second wireless intercom device to a second wireless access point in response to a determination that the second wireless access point is the home access point for the second wireless intercom device; and transmitting, by the second wireless access point, the second audio data stream from the second wireless intercom device to the intercom system.

9. The method of claim 8, wherein transmitting, by the first wireless access point, the second audio data stream from the second wireless intercom device to the second wireless access point includes transmitting the second audio data stream from the first wireless access point to the second wireless access point through a wired data connection communicatively coupling the first wireless access point to the second wireless access point.

10. The method of claim 9, wherein transmitting the second audio data stream from the first wireless access point to the second wireless access point through the wired data connection includes transmitting the second audio data stream from the first wireless access point to the second wireless access point through an Ethernet connection.

11. The method of claim 9, further comprising receiving, by the second wireless access point, a communication from a third wireless intercom device of the plurality of wireless intercom devices;

identifying, by the second wireless access point, a home access point for the third wireless intercom device;

transmitting, by the second wireless access point, a third audio data stream from the third wireless intercom device to the first wireless access point in response to a determination that the first wireless access point is the home access point for the third wireless intercom device; and transmitting, by the first wireless access point, the third audio data stream from the third wireless intercom device to the intercom system.

12. The method of claim 8, further comprising regulating, by the second wireless access point, the second audio data stream according to synchronization parameters defined for wireless intercom devices that have been assigned the second wireless access point as their home wireless access point and to minimize audio latency.

13. The method of claim 8, wherein identifying the home access point of the second wireless intercom device includes receiving a signal from the second wireless intercom device identifying the home access point assigned to the second wireless intercom device.

14. The method of claim 8, further comprising assigning a home access point to each wireless intercom device of the plurality of wireless intercom devices based on a location where each wireless intercom device of the plurality of wireless intercom devices is most often operated.

* * * * *